United States Patent [19]

Yoshino

[11] Patent Number: 5,250,881

[45] Date of Patent: Oct. 5, 1993

[54] HALL EFFECT MOTOR CONTROL CIRCUIT AND MOTOR DRIVE SYSTEM USING THE SAME

[75] Inventor: Motoyasu Yoshino, Kyoto, Japan

[73] Assignee: Rohm Co., Ltd., Kyoto, Japan

[21] Appl. No.: 925,783

[22] Filed: Aug. 7, 1992

[30] Foreign Application Priority Data

Aug. 8, 1991 [JP] Japan .................................. 3-223344

[51] Int. Cl.⁵ .............................................. H02P 7/00
[52] U.S. Cl. ...................................... 318/254; 318/439
[58] Field of Search ............................... 318/799-812, 318/254, 138, 439; 310/68 R

[56] References Cited

U.S. PATENT DOCUMENTS

| | | | |
|---|---|---|---|
| 3,903,463 | 9/1975 | Kanamori | 318/254 X |
| 4,047,084 | 9/1977 | Ban | 318/254 |
| 4,114,073 | 9/1978 | Uzuka | 318/254 X |
| 4,626,751 | 12/1986 | Doemen | 318/254 |
| 4,633,150 | 12/1986 | Inaji et al. | 318/254 |
| 4,658,190 | 4/1987 | Miyazaki et al. | 318/254 |
| 4,730,150 | 3/1988 | Lee et al. | 318/254 |
| 4,734,627 | 3/1988 | Koerner | 318/138 X |
| 4,922,513 | 5/1990 | Joichi | 318/254 |
| 4,958,118 | 9/1990 | Pottebaum | 318/799 X |

Primary Examiner—Jonathan Wysocki
Attorney, Agent, or Firm—Fay, Sharpe, Beall, Fagan, Minnich & McKee

[57] ABSTRACT

A motor control circuit, which includes an input amplifying circuit which receives a detection signal relating to the rotation of a motor from a Hall element and amplifies the same, and a motor drive circuit which generates a drive current upon receipt of an output signal from the input amplifying circuit and drives the motor and in which at least the input amplifying circuit and the motor drive circuit are formed in an IC, a resistor disposed between the power source line and the Hall element outside the circuit formed in an IC and a diode disposed between the Hall element and a reference line in the forward direction, and wherein the diode is formed in an IC together with the input amplifying circuit and the motor drive circuit, and the diode voltage of the diode induced at the connection side with the Hall element is set nearly equal to or higher than the lower limit voltage level of the input signal of the input amplifying circuit.

2 Claims, 3 Drawing Sheets

HALL EFFECT MOTOR CONTROL CIRCUIT AND MOTOR DRIVE SYSTEM USING THE SAME

BACKGROUND OF THE INVENTION

1. Field of the Invention

The present invention relates to a motor control circuit and a motor drive system using the same and, more specifically, relates to a motor control circuit used for devices such as video tape recoders, flexible disk drive devices (FDD), hard disk drive devices (HDD) and photo-magnetic disk drives which includes a Hall element as a rotating phase detection element or a rotating speed detection element for a motor and is designed so as to facilitate level adjustment of output signals generated from the Hall element even when the Hall element has some characteristic variation.

2. Description of Related Art

FIG. 3 shows a prior art three phase motor control circuit diagram.

The motor control circuit comprises three Hall elements 1,1,1, three differential amplifying circuits 2,2,2, an input amplifying circuit 3 including three switching circuits 5,5,5 (for avoiding complexly only one switching circuit 5 is illustrated in the drawing) and a motor drive circuit 4 for supplying drive currents to a motor 9 including three coils 8a, 8b and 8c. Further between the respective Hall elements 1 and the power source line +Vcc resistors (current limiting resistors) 6,6,6 for current limiting are connected and between the respective Hall elements 1 and the switching circuits 5 resistors (bias resistors) 7 for providing a bias voltage for the Hall elements 1 are connected, and these elements constitute a rotating phase detection circuit or a rotating speed detection circuit (hereinafter represented by the rotating phase detection circuit) for the motor 9.

The connecting conditions of the resistors 6, 7 to the backward Hall elements 1 in the drawing are the same as that to the front side Hall element 1. The respective phase detection circuits constituted by the respective Hall elements 1 and the resistors 6 and 7 are provided in parallel with respect to the power source line +Vcc. Further, when the switching circuit 5 has a large current carrying capacity, only one switching circuit which receives the currents from the respective Hall elements 1 is satisfactory. A detection circuit other than the above phase detection circuits constituted by three Hall elements connected in series between the resistors 6 and 7 may be used. In the both circuits the three Hall elements 1 operate in the same manner, hereinbelow the operation of one selected Hall element is pricipally explained.

Hall elements having four terminals e employed for the Hall elements 1, the Hall element 1 having two output terminals other than the connecting terminal for the current limiting resistor 6 and the connecting terminal for the bias resistor 7. When a magnetic field surrounding the Hall elements 1 varies in accordance with the rotation of the motor 9, a potential difference in response to the variation appears between the two output terminals of the Hall elements 1. The output signal generated from the Hall element 1 in response to the rotation of the motor 9 is a linear voltage signal having a sinusoidal waveform or the like. In order to generate such an output signal from the Hall element 1, it is necessary to supply beforehand a predetermined bias current I to the Hall element 1. The bias current I flows into the Hall element 1 from the power source line +Vcc via the current limiting resistor 6, when the switching ciruit 5 is rendered conductive upon receipt of a control signal A (see the drawing) which is generated in response to a power source turn-on signal or a motor start-up signal, and flows out to the ground line via the bias resistor 7 and the switching circuit 5. The value of the bias current I is primarily determined by the sum of the resistance of the current limiting resistor 6 and the bias resistor 7 and is adjusted thereby. Further, the voltage of the power source line +Vcc is divided by the current limiting resistor 6 and the bias resistor 7 and the bias voltage for the Hall element 1 is determined by the resistance value of the bias resistor 7 and is adjusted thereby. As a result, the Hall element I is provided with the bias current I and the bias voltage by the two resistors 6 and 7 for level adjustment use and is rendered into active condition. Thereby the detected signal V representing a motor rotating phase is outputted from the two output terminals to the differential amplifying circuit 2 in the input amplifying circuit 3.

The inverted terminal and the non-inverted terminal of the differential amplifying circuit 2 are respectively connected to the two output terminals of the Hall element 1. A resistor connected is to the input side of the differential amplifying circuit for determining the amplification rate and is omitted in the drawing. The differential amplifying circuit voltage-amplifies the signal v received at the inverted input terminal and the non-inverted input terminal and outputs a signal s corresponding to the output signal from the Hall element 1 to the motor drive circuit 4.

The motor drive circuit 4 comprises a control circuit 4d and output stage transistor circuits 4a, 4b and 4c for the motor drive currents. The control circuit 4d receives the three signals S from the input amplifying circuit 3, detects a motor rotating phase based upon these signals and drives the output stage transistor circuits 4a, 4b and 4c in response to the detected rotating phase. Through the control of the control circuit 4d, the output stage transistor circuit 4a sends out a drive current to the coil 8a, the output stage transistor circuit 4b sends out a drive current to the coil 8b and the output stage transistor circuit 4c sends out a drive current to the coil 8c. Accordingly, the motor 9 is controlled by the motor drive circuit 4 so as to rotate at an optimum rotating speed.

In the drawing, the circuit portion surrounded by a dotted line is a portion of the motor control circuit formed be in an IC. In the portion of the motor -control circuit formed in the IC, the differential amplifying circuit usually serves as a major portion of the input amplifying circuit. It is necessary to match the bias level for the operating point of the output signal from the Hall element with the input bias level under the static characteristic of the differential amplifying circuit.

A differential amplifying circuit of an NPN transistor having a high integration efficiency and having a large amplification rate with respect to the output signal from the Hall element is frequently used. In the differential amplifying circuit using an NPN transistor the input signal is usually applied to the base of the differential transistor, thereby, the bias level of the input signal is raised higher by 1Vf (the forward voltage drop of the PN junction) than the ground level. Therefore the output signal from the Hall element can not be sufficiently amplified unless the bias level of the signal at the Hall element side raises equal to or more than the bias level under the static characteristic of the input signal from the differential amplifying circuit.

For the above reason, the two resistors for level adjustment use are necessary at the Hall element side, one for the current adjustment use for determining the amplitude of the output signal and the other for the bias voltage setting use for determining the lower limit level of the output signal. The resistance values of these resistors are selected dependent upon the characteristic variation of the Hall element. Therefore the current limiting resistor is externally equipped to the power source side and the bias resistor is externally equipped to the ground side via the switching circuit. Accordingly, in the conventional three phase motor control circuit, the respective two resistors are externally equipped in addition to the respective Hall elements to thereby increase externally equipped components. Further, the voltage induced by the bias resistor varies dependent upon the drive current flowing through the Hall element, therefore it is necessary to select a proper combination of the three components in view of the characteristic of the Hall element and the resistance values of the two resistors.

As a result, there arises problems of a poor mounting efficiency of the three components during assemblage thereof and of a poor work efficiency thereof in the course of production of the motor drive devices including the motor control circuits formed in an IC, the Hall elements and the resistors. On the other hand, when the resistance values of the two resistors are fixed the work efficiency in the production of the devices is improved, however the selectable characteristic band of the Hall elements is narrowed dependent thereto and as a result, there arises a drawback that the component cost increases.

SUMMARY OF THE INVENTION

An object of the present invention is to provide a motor control circuit which reduces the number of level adjustment use resistors for Hall elements which are adapted to sense a rotating phase or a rotating speed of a motor and which is suitable for forming in an IC.

Another object of the present invention is to provide a motor control circuit which facilitates selection of adjustment use resistors by reducing the number of level adjustment use resistors to one for one Hall element to thereby improve the work efficiency in the course of production of the devices incorporating the motor control circuit.

A further object of the present invention is to provide a motor control circuit which improves a mounting efficiency during assemblage of the several components thereof in the course of production of the devices incorporating the motor control circuit and is suitable for forming in an IC.

A further object of the present invention is to provide a motor drive system which improves a mounting efficiency during assemblage of the several components thereof in the course of production of the drive system incorporating the motor control circuit and is suitable for forming in an IC.

The motor control circuit according to the present invention which includes an input amplifying circuit which receives a detection signal relating to the rotation of a motor from a Hall element and amplifies the same, and a motor drive circuit which generates a drive current upon receipt of an output signal from the input amplifying circuit and drives the motor and in which at least the above input amplifying circuit is formed in an IC, is characterized in that, a resistor disposed between the power source line and the Hall element outside the circuit formed in an IC and a diode disposed between the Hall element and a reference line in the forward direction are further provided, the diode is formed in an IC together with the input amplifying circuit and the diode voltage of the diode induced at the connection side to the Hall element is set nearly equal to or higher than the lower limit voltage level of the input signal of the input amplifying circuit.

As explained above, when the bias voltage of the Hall element is determined by providing the diode in the forward direction downstream of the Hall element, the bias voltage does not vary to such an extent to affect bias adjustment of the output signal from the Hall element even though the bias current flowing through the Hall element somewhat increases. As a result, the lower limit level of the output signal is substantially determined by the bias voltage and is maintained substantially constant even if the resistance value of the current limiting resistor somewhat varies which determines the amplitude of the output signal of the Hall element. Further, the bias voltage can be adjusted by a unit of 1vf. Therefore, the bias voltage can easily be corresponded to the bias level under the static characteristic of the input signal at the side of the input amplifying circuit so that when the amplitude of the output signal is determined with the resistance value of the current limiting resistor in response to the characteristic of the Hall element, the detection circuit which detects the rotating phase of the motor generates a proper output signal to the input amplifying circuit even if there is some variation in the characteristic of the Hall element.

Accordingly, the motor control circuit of the present invention dispenses with the conventional bias resistor, and the bias level of the Hall element is adapted to correspond to the input bias level of the input amplifying circuit. In particular, the bias level can be easily adjusted to a slightly higher value with respect to the input bias level under the static characteristic of the differential amplifying circuit. Further, when the input amplifying circuit is integrated together with the switching circuit, which starts the operation of the Hall element, into an IC, the diode is also integrated into the same IC. As a result, one resistor which was equipped externally is dispensed with, thereby adjustment of the bias current is facilitated dependent upon the number of reduction of the externally equipped resistors and the work easiness in the course of production of the motor control devices and the work effeciency during assemblage of their components are improved.

Further, the parts to be integrated into an IC form are not limited to the input amplifying circuit. When an IC type Hall element is used as the Hall elements such is surely included into the same IC and still further, even the current output stage can be integrated into the same IC.

DESCRIPTION OF THE PREFERRED EMBODIMENT

Figure 1:
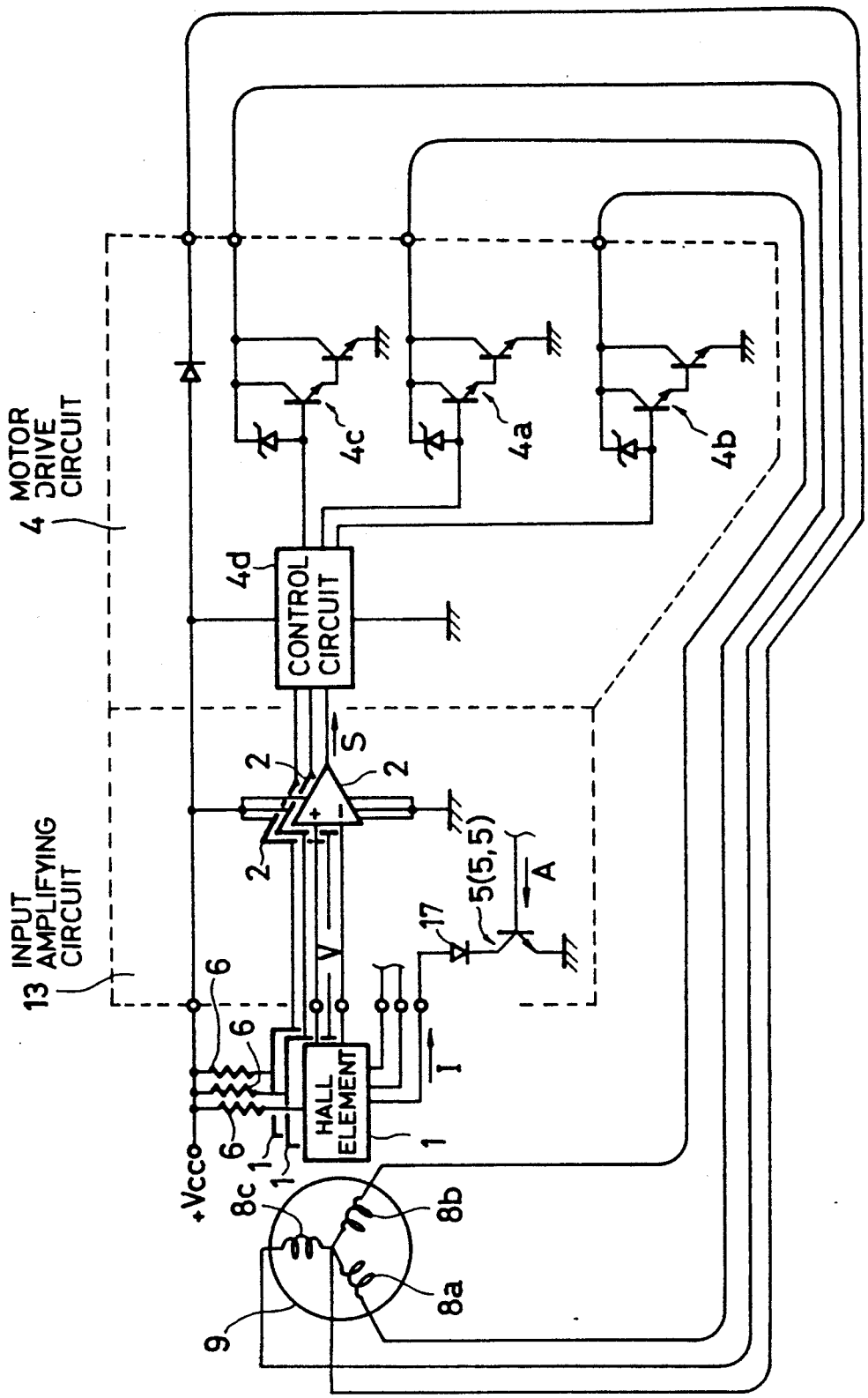
FIG. 1 is a three phase motor control circuit diagram of one embodiment of the motor control circuits according to the present invention.
Figure 3:
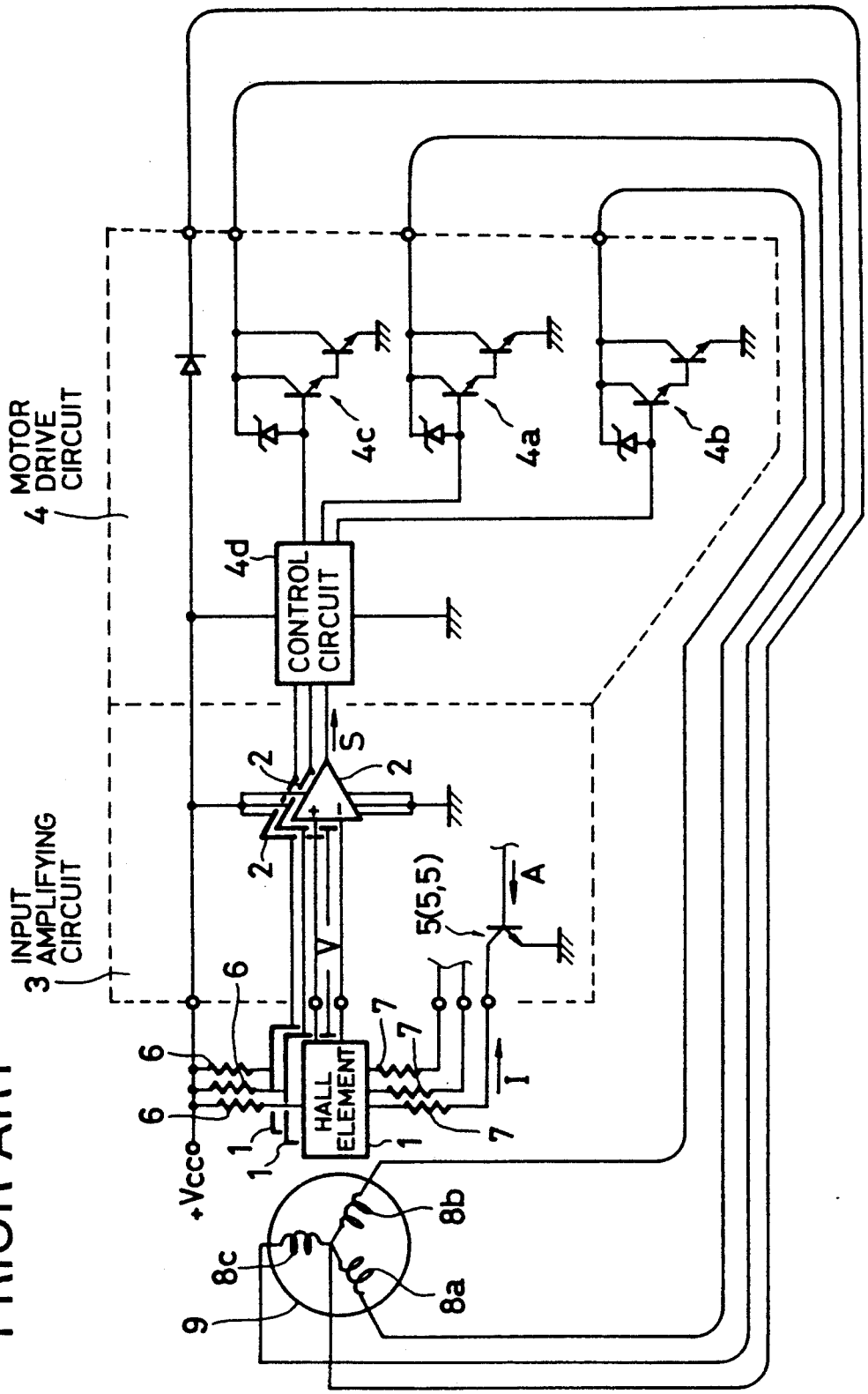
FIG. 3 is a three phase motor control circuit diagram of a prior art motor control circuit.

The differences between the motor control circuit shown in FIG. 1 and that shown in FIG. 3 are that a diode 17 serving as a level shift diode is disposed between the Hall element 1 and the switching circuit 5, and that the diode 17 is integrated into an IC form together with other circuits as indicated by a dotted frame. Three switching circuits 5 and three diodes 17 are actually provided for the respective Hall elements 1, however in the drawing only one switching circuit 5 and one diode 17 for one Hall element 1 are illustrated like in FIG. 3. Further, when only one switching circuit 5 is used as one of the modifications, it is unnecessary to incorporate three diodes 17 each for the respective three Hall elements 1, and only one diode 17 is satisfactory.

In the present embodiment, the value of the bias current I is set by the current limiting resistor 6 in accordance with the characteristic of the Hall element 1 and is adjusted thereby. The bias voltage for the Hall element 1 is determined by the sum of the forward voltage drop of the diode 17 and the voltage drop under the condition when the transistor in the switching circuit 5 is turned on and is maintained substantially constant to such a degree that no readjustment of the bias voltage for the Hall element is required even when the bias current I slightly varies dependent upon the resistance value of the current limiting resistor 6. Further, thereby the bias voltage is set at somewhat higher value than the bias level under the static characteristic of the input signal of the differential amplifying circuit 2. When an NPN transistor is used as a differential transistor, the base voltage of the differential amplifying circuit 2 is usually about the sum of 1Vf+the voltage generated by a constant current source provided at the downstream of the differential transistor.

In the present embodiment, one diode 17 serving as a level shift diode is provided and the bias voltage is established by the sum, which is substantially constant, of the voltage drop of the diode 17 and the voltage drop of the collector-emitter when the transistor in the switching circuit 5 is turned on. Thereby, the lower limit value of the signal output level of the Hall element 1 is adapted to be nearly equal to or higher than the lower limit voltage level of the input signal of the differential amplifying circuit 2. Still further, notwithstanding the current flow through the Hall element 1, the voltage at the bias point is kept substantially constant. When the output voltage from the Hall element 1 is higher than the lower limit voltage level of the input signal inputted to the differential amplifying circuit 2, even a microscopic input signal is correctly amplified even if there is a variation in the characteristic of the Hall element 1. Further, the amplitude level of the output signal of the Hall element 1 is properly set via selection of the resistance value of the current limiting resistor 6 with a sufficient room for the selection band. When the circuit is integrated into an IC, the bias voltage of the input signal of the differential amplifying circuit usually increases or decreases by a unit of 1vf, therefore, when the bias voltage of the input signal of the differential amplifying circuit is further raised by 1Vf it is preferable to provide two diodes 17 connected in series.

As will be understood from the above, the Hall element 1 is provided with a bias current I and a bias voltage via the selection of the resistance value of the current limiting resistor 6 and is maintained at its operating condition. The phase detection circuit detects the rotating phase of the motor 9 and outputs a voltage difference in a proper voltage level as an output signal from its two output terminals to the differential amplifying circuit 2. Further, the respective operations in the signal amplifier 2 in the input amplifying circuit 13, the motor drive circuit 4 and the motor coils 8a, 8b and 8c are the same as in the conventional circuit. Still further, in the output stage transistor circuit of the motor drive circuit in the drawing a unidirectional drive circuit is exemplified, however a bidirectional drive circuit is also applicable.

Figure 2:
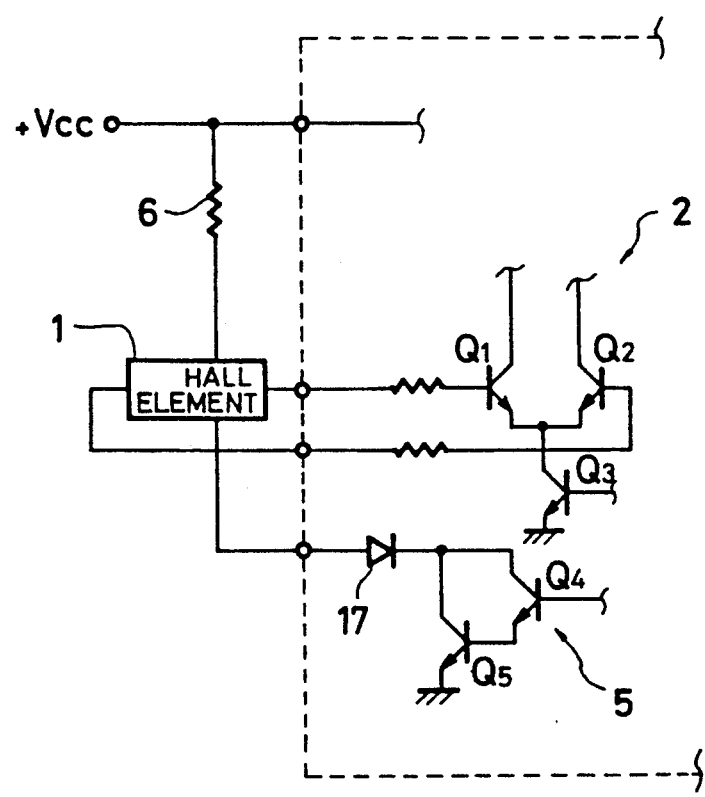
FIG. 2 is a view for explaining a connection relation of the Hall element and the input amplifying circuit in the circuit of FIG. 1.

FIG. 2 shows a relationship between the Hall element and the differential amplifying circuit constituted by differential transistors Q1 and Q2 and a constant current source transistor Q3 in a specific example. In the present example, the switching circuit 5 is constituted by transistors Q4 and Q5 in Darlington connection.

The minimum input voltage value Vain of the differential amplifying circuit 2 thus constituted becomes as follows, $$Vmin \approx VBEQ1 + VBEQ3 = 2Vf$$

wherein, VBEQ1 is the voltage drop between base-emitter of the transistor Q1 and VBEQ3 is the voltage drop between base-emitter of the transistor Q3. On the other hand, the bias voltage VBH of the Hall element 1 is as follows, $$VBH = VQ4SAT + VBEQ5 + 1Vf = 2Vf + VQ4SAT$$

wherein, VQ4SAT is the voltage drop when the transistor Q4 is turned on, and VBEQ5 is the voltage drop between the base-emitter of the transistor Q5.

By the above constitution, the lower limit output signal of the Hall element 1 can be amplified by the differential amplifying circuit constituted by the transistors Q1, Q2 and Q3. When the switching circuit 5 is constituted by the transistors Q4 and Q5 in Darlington connection, the potential difference at this portion is large with respect to a single transistor, a large bias voltage can be applied. Further, even when the diode 17 is a zenor diode, the same operation as the above is possible and the zenor diode is likely integrated into the same IC. Still further, in the case that the control circuit is used for the control of the apparatuses which are subjected to a temperature rise such as the motor, since both the diode 17 and the differential amplifying circuit 2 are constituted by semiconductor elements, when the bias voltage for the Hall element 1 is generated by the diode 17, the temperature characteristic of the bias voltage for the Hall element can be matched to the temperature characteristic of the input bias level of the differential amplifying circuit 2 to thereby cancel out the influence due to temperature variation. Moreover, the control circuit is hardly affected by the bias current variation due to secular change.

In the present embodiment as illustrated in the drawing, the switching circuit 5 is constituted by making use of the NPN transistor in order to match the bias voltage for the Hall element 1 with the bias level of the input signal of the differential amplifying circuit, however a PNP transistor may be used for matching with the bias level of the input signal of the differential amplifying circuit.

In the above constitution, it is sufficient only if the resistance value of the current limiting resistor 6 is selected so as to match with the characteristic of the Hall element 1. Further, one current adjusting resistor for one Hall element 1 is satisfactory. Still further, it is only required to adjust the bias current even if the characteristics of the Hall elements 1 vary, Hall elements having relatively large characteristic variation can be used for the circuit to thereby improve the production efficiency of the devices including the present motor control circuit. Further, since the characteristics of the Hall elements are divided into a plurality of ranks and are dealt with accordingly, the current limiting resistors 6 can be divided into ranks so as to corresponds to the ranks of the Hall elements in one to one relationship and can be dealt with accordingly. Still further, when current limiting resistors having a predetermined resistance value are selected and prepared to match the Hall elements exhibiting a predetermined characteristic which, appears statistically most frequently, the selecting work of the current limiting resistors is eliminated to thereby further improve the production efficiency.

In the present embodiment, a three phase motor control circuit is exemplified, however the present invention is also applicable to a single phase motor and a two phase motor.

I claim:

1. A motor control circuit including an input amplifying circuit which receives a detection signal relating to the rotation of the motor from a hall element and amplifies the detection signal to provide an output signal, and a motor drive circuit connected to a power source line and receiving said output signal for generating a drive current that drives the motor and in which at least said input amplifying circuit is formed in an IC, comprising:
   said hall element generating first and second outputs,
   said input amplifying circuit having a differential amplifying circuit including a first transistor of an NPN type having a base that receives the first output of the hall element, a second transistor of an NPN type having a base that receives the second output of the hall element, and a constant current source circuit constituted by one transistor of an NPN type having a collector that receives the current of emitters of the first and second transistors and having an emitter that is connected to a reference line,
   a resistor connected between the power source line and the hall element having a predetermined resistance value dependent upon the characteristic of the hall element,
   a switching circuit including two transistors of NPN type in Darlington connection of which the emitter is connected to said reference line, and
   a diode disposed between the hall element and said reference line in the forward direction and connected to the reference line via said switching circuit; and wherein said diode and said switching circuit are formed in said IC together with said input amplifying circuit, the hall element is outside the circuit formed in said IC, and the diode voltage of said diode induced at the connection side with the hall element is set nearly equal to or higher than the lower limit voltage level of the input signal of said input amplifying circuit.

2. A motor drive system having a motor and a control circuit including an input amplifying circuit which receives a detection signal relating to the rotation of the motor from a hall element and amplifies the detection signal to provide an output signal, and a motor drive circuit connected to a power source line and receiving said output signal for generating a drive current that drives the motor and in which at least said input amplifying circuit is formed in an IC, comprising:
   said hall element generating first and second
   said input amplifying circuit having a differential amplifying circuit including a first transistor of an NPN type having a base that receives the first output of the hall element, a second transistor of an NPN type having a base that receives the second output of the hall element, and a constant current source circuit constituted by one transistor of an NPN type having a collector that receives the current of emitters of the first and second transistors and having an emitter that is connected to a reference line,
   a resistor connected between the power source line and the hall element having a predetermined resistance value dependent upon the characteristic of the hall element,
   a switching circuit including two transistors of NPN type in Darlington connection of which the emitter is connected to said reference line, and
   a diode disposed between the hall element and said reference line in the forward direction and connected to the reference line via said switching circuit; and wherein said diode and said switching circuit are formed in said IC together with said input amplifying circuit, the hall element is outside the circuit formed in said IC, and the diode voltage of said diode induced at the connection side with the hall element is set nearly equal to or higher than the lower limit voltage level of the input signal of said input amplifying circuit.

* * * * *